United States Patent
Kassenaar

(10) Patent No.: US 7,768,568 B2
(45) Date of Patent: Aug. 3, 2010

(54) CAMERA COMPRISING MEANS FOR RETAINING A LENS AT TWO DIFFERENT POSITIONS

(75) Inventor: Teunis Adrianus Kassenaar, Eindhoven (NL)

(73) Assignee: TPO Hong Kong Holding Limited, Shatin (HK)

( * ) Notice: Subject to any disclaimer, the term of this patent is extended or adjusted under 35 U.S.C. 154(b) by 443 days.

(21) Appl. No.: 10/549,647

(22) PCT Filed: Mar. 18, 2004

(86) PCT No.: PCT/IB2004/050285

§ 371 (c)(1),
(2), (4) Date: Sep. 20, 2005

(87) PCT Pub. No.: WO2004/086113

PCT Pub. Date: Oct. 7, 2004

(65) Prior Publication Data

US 2006/0203116 A1    Sep. 14, 2006

(30) Foreign Application Priority Data

Mar. 24, 2003    (EP) .................................. 03100743

(51) Int. Cl.
*H04N 5/225* (2006.01)
(52) U.S. Cl. ...................................... 348/340; 348/374
(58) Field of Classification Search ................. 348/335, 348/340, 373, 374, 375, 376
See application file for complete search history.

(56) References Cited

U.S. PATENT DOCUMENTS

| | | | |
|---|---|---|---|
| 4,841,323 A * | 6/1989 | Yamada et al. ................ | 396/90 |
| 5,032,919 A | 7/1991 | Randmae | |
| 6,476,985 B2 * | 11/2002 | Dou et al. .................... | 359/823 |
| 2002/0141078 A1 | 10/2002 | Midorikawa et al. | |
| 2003/0048365 A1 | 3/2003 | Saito et al. | |
| 2004/0095499 A1 * | 5/2004 | Ning ........................... | 348/335 |

FOREIGN PATENT DOCUMENTS

| | | |
|---|---|---|
| JP | 10-248029 | 9/1998 |
| JP | 11-293734 | 10/1999 |
| JP | 2002-296476 | 10/2002 |

* cited by examiner

*Primary Examiner*—Justin P Misleh
(74) *Attorney, Agent, or Firm*—Raymond J. Ho; Morris Manning and Martin

(57) ABSTRACT

An imaging module (1) comprises an upper portion (20, 60, 70, 80) and an under portion (10, 30, 40, 50), which are movable with respect to each other.

Figure 1:
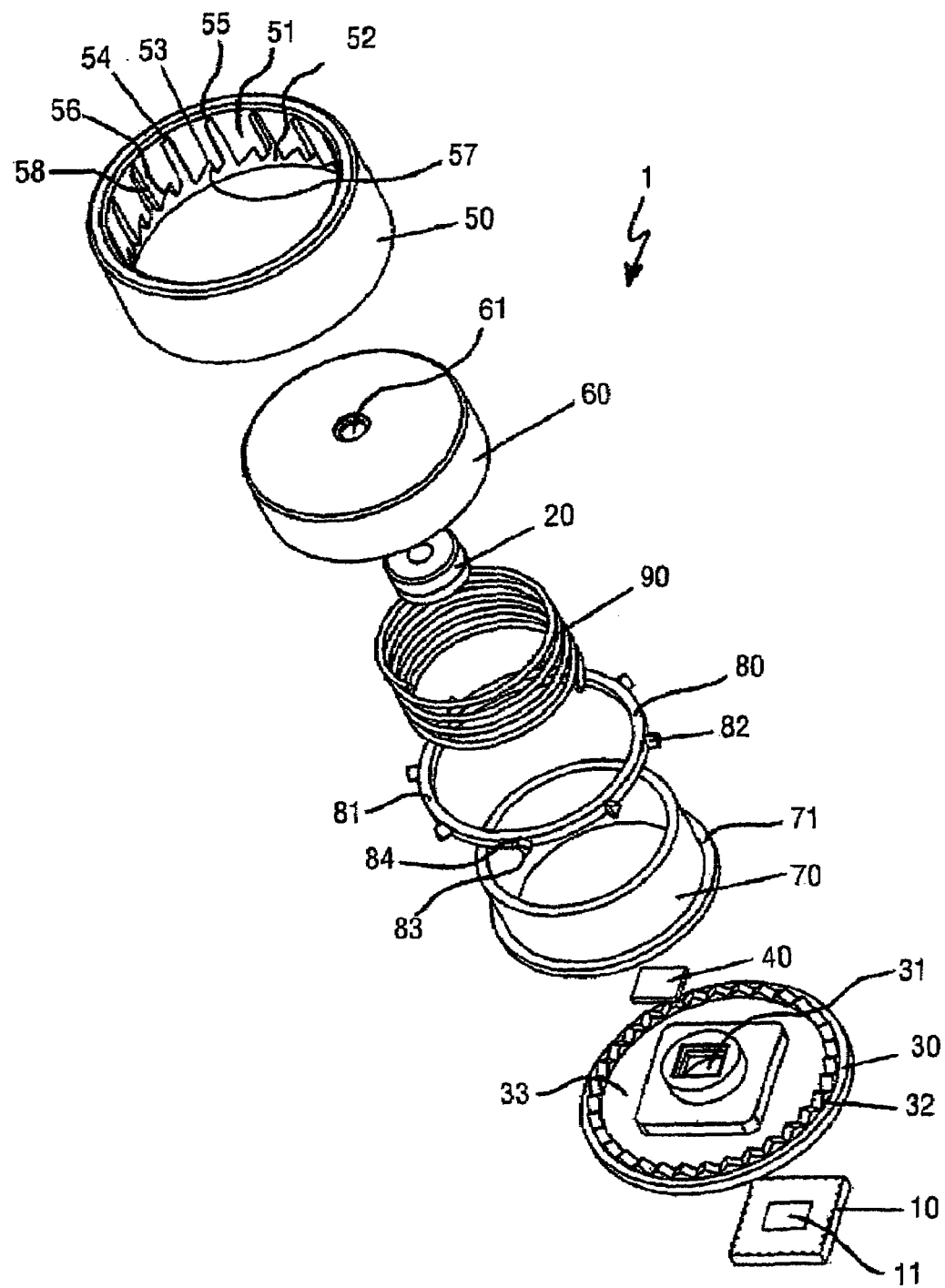

The under portion (10, 30, 40, 50) holds an image sensor chip (10) and has a toothed recess (52) comprising alternating short slots (53) and long slots (54).

The upper portion (20, 60, 70, 80) holds a lens (20) and has a rotatably arranged rotor (80). Protrusions (82) of the rotor (80) are positioned in the recess (52) of the under portion (10, 30, 40, 50), wherein the upper portion is pressed upwards under the influence of a spring (90).

Every time the upper portion (20, 60, 70, 80) is pressed towards the under portion (10, 30, 40, 50) and subsequently released, the protrusions (82) of the rotor (80) are received by another slot (53, 54). In this way, the distance between the lens (20) and the image sensor chip (10) can be varied.

14 Claims, 2 Drawing Sheets

CAMERA COMPRISING MEANS FOR RETAINING A LENS AT TWO DIFFERENT POSITIONS

The present invention relates to an imaging module, comprising an image sensor chip and a lens, wherein the lens and the image sensor chip are movable with respect to each other.

Such an imaging module is known, and may be part of for example a cellular phone. For the purpose of such an application of the imaging module, it is desirable that the height of the imaging module, which is mainly determined by a focal distance between the lens and the image sensor chip, is as small as possible. However, in order to obtain a sharp image of an acceptable quality, the focal distance between the lens and the image sensor chip should not be smaller than a lower limit of at least a few millimeters.

According to the state of the art, the above-sketched dilemma regarding the distance between the lens and the image sensor chip is solved by means of an imaging module comprising a movable lens holder, wherein the position of the lens holder with respect to the image sensor chip is controlled by means of a slide having an inclined ramp. This slide is movable in a direction perpendicular to the direction in which the lens holder is movable with respect to the image sensor chip, and contacts the lens holder through the inclined ramp. The lens holder rests on the inclined ramp, so that the distance between the lens holder and the image sensor chip can simply be adjusted by moving the slide. In this way, the slide can be used to move the lens between a retracted position and an extracted position, the latter position being associated with an operative state of the imaging module.

It is an objective of the present invention to provide an imaging module, which is easier to operate than the imaging module according to the state of the art, and which does not require a separate element for controlling the distance between the lens and the image sensor chip. The objective is achieved by means of an imaging module, comprising an image sensor chip; a lens, wherein the lens and the image sensor chip are movable with respect to each other; first retaining means for retaining the lens with respect to the image sensor chip at a first distance; and second retaining means for retaining the lens with respect to the image sensor chip at a second distance.

In the imaging module according to the present invention, the lens and the image sensor are movable with respect to each other in an axial direction, that is a direction in which an axis of symmetry of the lens extends. In order to avoid falling apart of the imaging module, retaining means are provided. According to an important aspect of the present invention, two retaining means are present in the imaging module, wherein first retaining means are for retaining the lens at a first distance with respect to the image sensor chip, and wherein second retaining means are for retaining the lens at a second distance with respect to the image sensor chip. The two distances may be chosen such that the first distance corresponds to the focal distance, and that the second distance is smaller than the first distance, so that the lens can be kept at a retracted position when the imaging module is in a non-operative state.

In the following, the position in which the lens is retained by the first retaining means is referred to as first retained position, and the position in which the lens is retained by the second retaining means is referred to as second retained position.

In the imaging module according to the present invention, the position of the lens with respect to the image sensor chip can be easily adjusted. For example, starting from the first retained position, only three steps need to be performed in order to bring the lens at the second retained position, wherein a first step comprises releasing the lens from the first retaining means by moving the lens in an inward direction with respect to the image sensor chip, a second step comprises bringing the lens to a position starting from which engagement between the lens and the second retaining means may be effected when the lens is moved in an outward direction with respect to the image sensor chip, and a third step comprises moving the lens in an outward direction with respect to the image sensor chip. According to an important aspect of the present invention, all that is needed for performing the three steps is a movement of the lens with respect to the image sensor chip, which can be manually controlled by a user.

In a preferred embodiment, the imaging module according to the present invention comprises pressing means for pressing the lens and the image sensor chip in an outward direction with respect to each other. In this embodiment, during the first step of the process of bringing the lens from the first retained position to the second retained position, an inwardly directed pressure needs to be exerted in order to compress the pressing means and to release the lens from the first retaining means. During the second step, in which the lens is brought to a position in which the lens is ready to come into engagement with the second retaining means, the inwardly directed pressure is maintained. In fact, during the first step, the pressing means are ruled out, and during the second step, the position of the lens is adjusted such that the lens may come into engagement with the second retaining means when the pressing means are allowed to act again. Finally, during the third step, the pressing means are actually allowed to act again.

Figure 2:
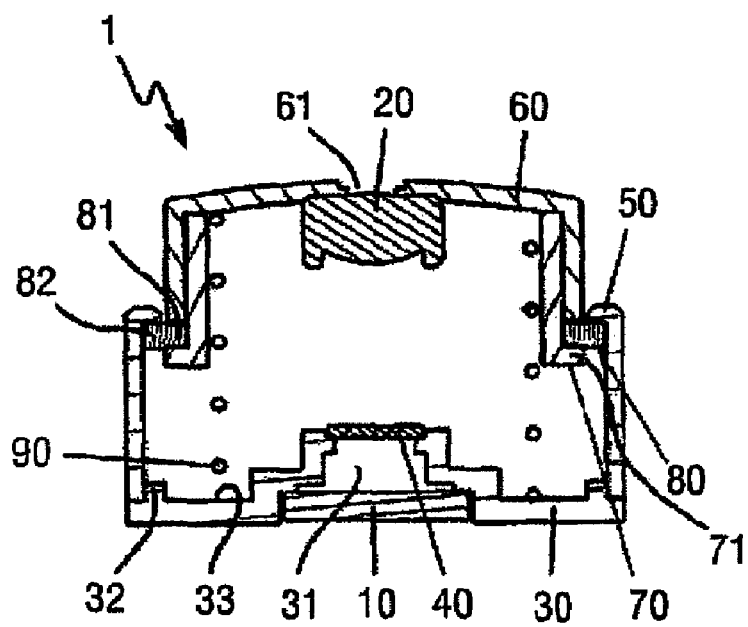
Figure 3:
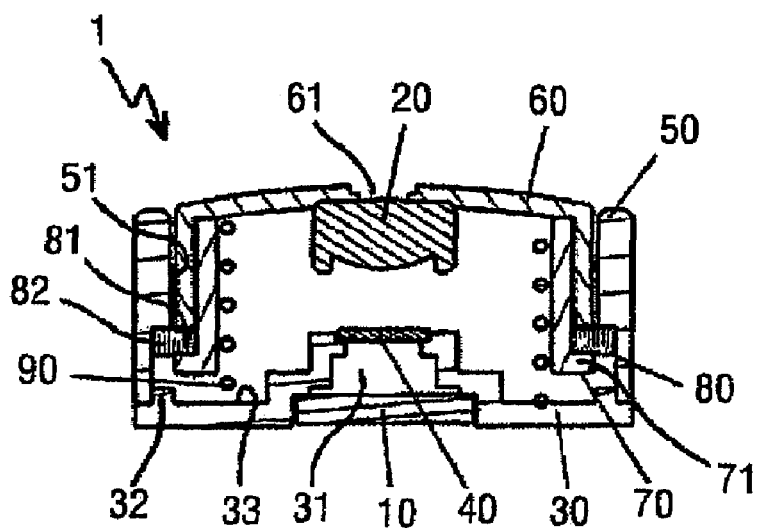

The present invention will now be explained in greater detail with reference to the figures, in which similar parts are indicated by the same reference signs, and in which:

FIG. 1 is an exploded view of a preferred embodiment of an imaging module according to the present invention, FIG. 2 is a sectional side view of the imaging module as shown in FIG. 1, wherein a lens of the imaging module is at a first retained position, and FIG. 3 is another sectional side view of the imaging module as shown in FIG. 1, wherein the lens is at a second retained position.

In FIGS. 1-3, a preferred embodiment of an imaging module 1 according to the present invention is shown. The imaging module 1 comprises an image sensor chip 10 having a light-sensitive surface 11, and a lens 20.

In the following, the terms "up" and "under" and derived terms relate to an orientation of the imaging module 1 as shown in FIGS. 1-3, wherein the image sensor chip 10 is positioned at an under side of the imaging module 1, while the lens 20 is positioned at an upper side of the imaging module 1. It will be understood that this definition is arbitrary, as the imaging module 1 may have a totally different orientation than the one as shown in FIGS. 1-3. This definition should therefore not be regarded as having a limiting effect on the scope of the present invention.

The imaging module 1 comprises a foot 30 having a substantially centrally positioned through hole 31. At the bottom of the hole 31, the image sensor chip 10 is positioned, whereas at the top of the hole 31, an infrared filter 40 is positioned. Near the outer circumference of the foot 30, an annular string of triangular protrusions 32 is present on a top surface 33 of the foot 30.

The foot 30 supports a housing 50, which is substantially shaped as a hollow cylinder having open ends. A central axis of the housing 50 extends substantially perpendicular to the light-sensitive surface 11 of the image sensor chip 10. Parts of an inner surface 51 are removed, such that a recess 52 having a toothed appearance is formed, comprising alternating short slots 53 and long slots 54 which extend from an under side of the housing 50 to an upper side of the housing 50, and which are accessible at the under side of the housing 50.

The lens 20 is held by a cap 60, which is substantially shaped as a hollow cylinder having one open end and one closed end. In the closed end, a through hole 61 is provided, and the lens 20 is positioned underneath that hole 61. It will be understood that the hole 61 is for letting through rays of light to the lens 20.

A curved part of an inner surface of the cap 60 is covered by a barrel 70, which is permanently attached to the cap, for example by means of glue. An under side of the barrel 70 extends beyond an under side of the cap 60 and comprises a flange 71, wherein an upper side of the flange 71 is located at a distance from the under side of the cap 60. In this way, a recess is formed between the upper side of the flange 71 and the under side of the cap 60. In the space offered by this recess, a ring 81 of a rotor 80 is positioned, which is supported by the upper side of the flange 71, and which is able to rotate freely around the barrel 70.

The rotor 80 comprises a number of triangular protrusions 82, which are located at the outer circumference of the ring 81. The entirety of cap 60, barrel 70 and rotor 80 is positioned such that the protrusions 82 of the rotor 80 are positioned inside the toothed recess 52 in the inner surface 51 of the housing 50.

The imaging module 1 according to the present invention comprises a helical spring 90, which extends between the cap 60 and the foot 30. The spring 90 is inclined to press the cap 60 away from the foot 30. Nevertheless, falling apart of the elements of the imaging module 1 is not possible, as the protrusions 82 of the rotor can not leave the recess 52 in the inner surface 51 of the housing 50. It will be readily understood that when the protrusions 82 of the rotor 80 are inside the long slots 54 of the recess 52 in the housing 50, the distance between the image sensor chip 10 and the lens 20 is relatively large, and that when the protrusions 82 are inside the short slots 53, said distance is relatively short. In the following, a description will be given of the way in which the distance between the image sensor chip 10 and the lens 20 can be varied.

When the lens 20 is at a first retained position, as shown in FIG. 2, the distance between the lens 20 and the image sensor chip 10 equals a focal distance associated with the lens 20. Therefore, when the lens 20 is at this position, the imaging module 1 is in an operative state, and a sharp image can be obtained.

In the operative state of the imaging module 1, the protrusions 82 of the rotor 80 abut against upper sides 55 of the long slots 54 of the recess 52 in the housing 50. As the upper sides 55 of the long slots 54 are close to the upper side of the housing 50, and the rotor 80 is positioned at the under side of the cap 60, in the operative state of the imaging module 1, the under side of the cap 60 is approximately at the same level as the upper side of the housing 50. In all possible positions of the imaging module 1, the lens 20 is kept at the first retained position under the influence of the spring 90 exerting an upwardly directed pressure force on the cap 60.

In order to change the state of the imaging module 1 from the operative state to a non-operative state, a user should exert an inwardly directed pressure, that is a pressure directed towards the image sensor chip 10, on the cap 60. As soon as the inwardly directed pressure exerted by the user is higher the outwardly directed pressure exerted by the spring 90, the entirety of cap 60, barrel 70, rotor 80 and lens 20 starts to move in the direction of the image sensor chip 10. At one stage during the movement, the protrusions 82 of the rotor 80 contact the protrusions 32 being present on the top surface 33 of the foot 30. The shape and positions of the protrusions 82 of the rotor 80 on the one hand and the protrusions 32 on the foot 30 on the other hand are adapted to each other in such a way that when the movement is continued, the rotor 80 is forced to rotate. During the process, inclined surfaces of the protrusions 82 of the rotor 80 slide along inclined surfaces of the protrusions 32 on the foot 30, until a lowest tip 83 of the protrusions 82 of the rotor 80 reaches the lowest level of the string of protrusions 32 on the foot 30, right in between two protrusions 32. At that moment, the user senses that the cap 60 can not be moved any further inwards. When the user releases the pressure, the cap 60 is pressed away from the image sensor chip 10 again under the influence of the spring 90. The automatic movement of the entirety of cap 60, barrel 70, rotor 80 and lens 20 ends as soon as the protrusions 82 of the rotor 80 contact an upper side 56 of the short slots 53 of the recess 52 in the housing 50. Due to the forced rotation of the rotor 80, the protrusions 82 are not any longer in a position to contact the upper side 55 of the long slots 54 again.

The upper side 56 of the short slots 53 is inclined. As a result, a highest tip 84 of the protrusions 82 of the rotor 80 slides along the upper side 56 until the protrusions 82 abut against a side 57 of the short slots 53. At that point, the rotation of the rotor 80 is stopped, and the associated outwardly directed movement of the cap 60, the barrel 70 and the lens 20 is stopped. The lens 20 is then at a second retained position, as shown in FIG. 3, wherein the distance between the lens 20 and the image sensor chip 10 is smaller than the focal distance, and the imaging module 1 is in a non-operative state. In this state, an upper side of the cap 60 is approximately at the same level as the upper side of the housing 50. In all possible positions of the imaging module 1, the lens 20 is kept at the second retained position under the influence of the spring 90 exerting an upwardly directed pressure force on the cap 60.

When a user desires to change the state of the imaging module 1 to an operative state again, he needs to press the cap 60 in an inward direction again. During this process, as soon as the protrusions 82 of the rotor 80 do not longer contact the side 57 of the short slots 53, and the protrusions 82 of the rotor contact the protrusions 32 on the foot 30 instead, the rotor 80 is forced to rotate until the lowest tip 83 of the protrusions 82 of the rotor 80 reaches the lowest level of the string of protrusions 32 on the foot 30, right in between two protrusions 32. When the user stops exerting pressure, the cap 60 is pressed away from the image sensor chip 10 again under the influence of the spring 90. The automatic movement of the entirety of cap 60, barrel 70, rotor 80 and lens 20 ends as soon as the protrusions 82 of the rotor 80 contact the upper side 55 of the long slots 54 of the recess 52 in the housing 50. Due to the forced rotation of the rotor 80, the protrusions 82 are not any longer in a position to contact the upper side 56 of the short slots 53 again.

The upper side 55 of the long slots 54 is inclined. As a result, the highest tip 84 of the protrusions 82 of the rotor 80 slides along the upper side 55 until the protrusions 82 abut against a side 58 of the long slots 54. At that point, the rotation of the rotor 80 is stopped, and the associated outwardly directed movement of the cap 60, the barrel 70 and the lens 20 is stopped. The lens 20 is then at the first retained position again.

It will be clear from the above that all that a user needs to do to change the state of the imaging module 1 is to press the cap 60 in an inward direction until the cap 60 can not move any further, and then stop exerting pressure. Due to the forced rotation of the rotor 80 which takes place as a result of contact between the protrusions 82 of the rotor 80 and the protrusions 32 on the foot 30, the protrusions 82 of the rotor 80 are displaced with respect to the housing 50, and are received by other slots 53, 54 of the recess 52 in the housing 50 than before.

In the shown embodiment of the imaging module 1 according to the present invention, rotation of the rotor 80 always takes place in the same direction.

In a possible embodiment of the imaging module according to the present invention, which is not shown in any of the figures, the barrel 70 and the rotor 80 are integral parts of the cap 60, or only the rotor 80 is an integral part of the cap 60 and the barrel 70 is omitted. In such an embodiment, a user is also able to change the state of the module by pressing the cap 60 in an inward direction. However, in the process of changing from an operative state to a non-operative state and vice versa, the cap 60 rotates with respect to the foot 30. It will be understood that an embodiment of the imaging module 1 according to the present invention comprising a rotatably arranged rotor 80 is preferred, as in such an embodiment, an angular displacement of the cap 60 is not required for the purpose of changing the state of the imaging module 1.

It will be clear to a person skilled in the art that within the scope of the present invention, the rotor 80 and the protrusions 32 on the foot 30 for automatically changing the state of the imaging module 1 from operative to non-operative and vice versa when the cap 60 is pressed in an inward direction and released again, are not essential elements. However, an imaging module 1 comprising said elements is preferred, as it is very easy to operate such a module 1. In an alternative imaging module without rotor 80 and protrusions 32 on the foot 30, the under side of the cap 60 may comprise protrusions which are positioned inside the toothed recess 52 in the inner surface 51 of the housing 50, and the barrel 70 may be omitted. In order to change the state of such a module, a user does not only need to press the cap 60 in an inward direction and to release the cap 60 again, but also needs to rotate the cap 60. Preferably, measures are taken to facilitate manual rotation of the cap 60. An upper surface of the cap 60 may for example be provided with ribs or small protrusions, so the user can have some grip on the cap 60.

In the alternative imaging module, it is possible that the inner surface 51 of the housing 50 is provided with protrusions and that an outer surface of the cap comprises a recess for receiving the protrusions.

It will be clear to a person skilled in the art that the scope of the present invention is not limited to the examples discussed in the foregoing, but that several amendments and modifications thereof are possible without deviating from the scope of the present invention as defined in the attached claims.

In the foregoing, an imaging module 1 is described. The imaging module 1 comprises an upper portion 20, 60, 70, 80 and an under portion 10, 30, 40, 50, which are movable with respect to each other. A spring 90 is provided to press the upper portion 20, 60, 70, 80 and the under portion 10, 30, 40, 50 in an outward direction with respect to each other.

The under portion 10, 30, 40, 50 comprises a foot 30 for holding an image sensor chip 10, and a housing 50 having a toothed recess 52. The recess 52 comprises alternating short slots 53 and long slots 54.

The upper portion 20, 60, 70, 80 comprises a cap 60 for holding a lens 20, and a rotatably arranged rotor 80. A ring 81 of the rotor 80 is positioned between an under side of the cap 60 and a flange 71 of a barrel 70, whereas protrusions 82 of the rotor 80 are positioned in the recess 52 in the housing 50.

When the cap 60 is pressed towards the foot 30, the rotor 80 is forced to rotate by protrusions 32 on the foot 30 contacting the protrusions 82 on the rotor 80. When the cap 60 is released again, the protrusions 82 on the rotor 80 are received by another slot 53, 54 of the recess 52 than before. In this way, the distance between the lens 20 and the image sensor chip 10 can be varied.

The invention claimed is:

1. An imaging module, comprising:

an image sensor chip;

a lens, wherein the lens and the image sensor chip are movable with respect to each other;

a first retaining means for retaining the lens with respect to the image sensor chip at a first distance;

a second retaining means for retaining the lens with respect to the image sensor chip at a second distance; and a positioning means comprising a rotor and a foot, wherein the foot comprises at least an inclined surface with the rotor sliding thereon and circulating around the lens for automatically activating the second retaining means when the first retaining means are deactivated, and vice versa.

2. The imaging module according to claim 1, wherein the first and second retaining means are designed such as to be brought in a deactivated state by a movement of the lens and the image sensor chip in an inward direction with respect to each other, and in an activated state by a movement of the lens and the image sensor chip in an outward direction with respect to each other.

3. The imaging module according to claim 1, wherein the foot plurality of inclined surfaces with the rotor sliding thereon.

4. The imaging module according to claim 1, wherein the image sensor chip is located at an under portion of the imaging module, wherein the lens is held by an upper portion of the imaging module, wherein the under portion and the upper portion are movable with respect to each other, wherein the under portion is provided with first engaging means, and wherein the upper portion is provided with second engaging means for engaging the first engaging means.

5. The imaging module according to claim 4, wherein the upper portion is provided with upper protrusions, and wherein the under portion comprises a recess for receiving the upper protrusions.

6. The imaging module according to claim 5, wherein the upper protrusions have a triangular shape.

7. The imaging module according to claim 5, wherein the recess in the under portion comprises long slots and short slots.

8. The imaging module according to claim 7, wherein upper sides of the slots are inclined.

9. The imaging module according to claim 5, wherein the under portion comprises lower protrusions which are positioned such as to contact the upper protrusions of the upper portion of the imaging module.

10. The imaging module according to claim 9, wherein the lower protrusions have a triangular shape.

11. The imaging module according to claim 5, wherein the upper portion comprises a rotatable rotor supporting the upper protrusions.

12. The imaging module according to claim 1, wherein the first distance corresponds to a focal distance of the lens, and wherein the second distance is smaller than the first distance.

13. The imaging module Imaging module according to claim 1, further comprising pressing means for pressing the lens and the image sensor chip in an outward direction with respect to each other, the pressing means preferably comprising a helical spring.

14. A cellular phone, comprising the imaging module according to claim 1.

* * * * *